(No Model.) 3 Sheets—Sheet 1.

E. A. HILLS.
COMBINED HAY RAKE AND TEDDER.

No. 254,132. Patented Feb. 28, 1882.

Witnesses.
Chas. L. Burdett
Wilmot Horton

Inventor.
Edwin A. Hills
by Theo. G. Ellis, Attorney (No Model.) 3 Sheets—Sheet 2.
E. A. HILLS.
COMBINED HAY RAKE AND TEDDER.
No. 254,132. Patented Feb. 28, 1882.

Witnesses.
Chas. L. Burdett
Wilmot Horton

Inventor.
Edwin A. Hills
by Theo. G. Ellis, Attorney

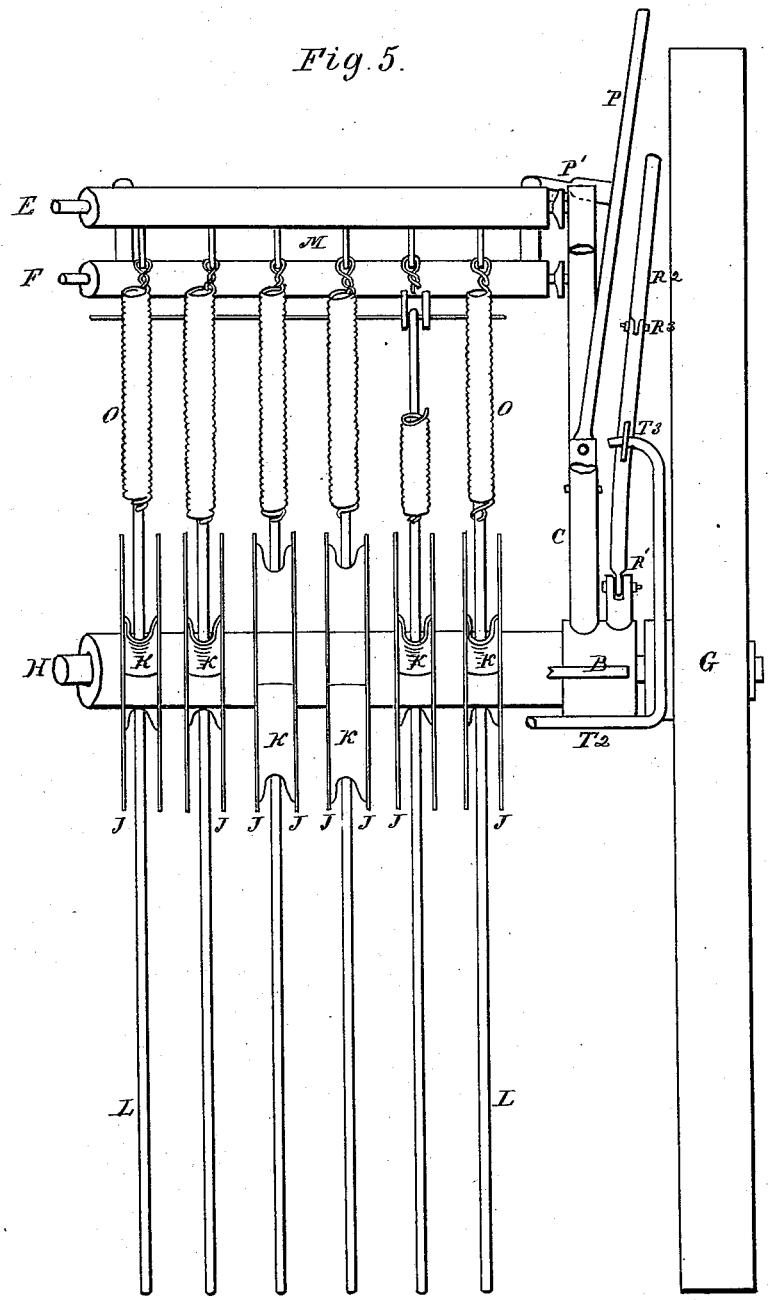

UNITED STATES PATENT OFFICE.

EDWIN A. HILLS, OF WETHERSFIELD, CONNECTICUT.

COMBINED HAY RAKE AND TEDDER.

SPECIFICATION forming part of Letters Patent No. 254,132, dated February 28, 1882.

Application filed May 4, 1881. (No model.)

*To all whom it may concern:*

Be it known that I, EDWIN A. HILLS, of Wethersfield, in the county of Hartford and State of Connecticut, have invented certain new and useful Improvements in Hay Rake and Tedder Combined; and I do hereby declare that the following is a full, clear, and exact description thereof, whereby a person skilled in the art can make and use the same, reference being had to the accompanying drawings, and to the letters of reference marked thereon.

Like letters in the figures indicate the same parts.

My improvements relate to horse hay rakes and tedders united in the same machine, so that it can readily be converted from one to the other, as may be desired for use.

The object of my invention is to provide one machine which will do the work of two separate machines in a more perfect manner than has heretofore been done.

Figure 1:
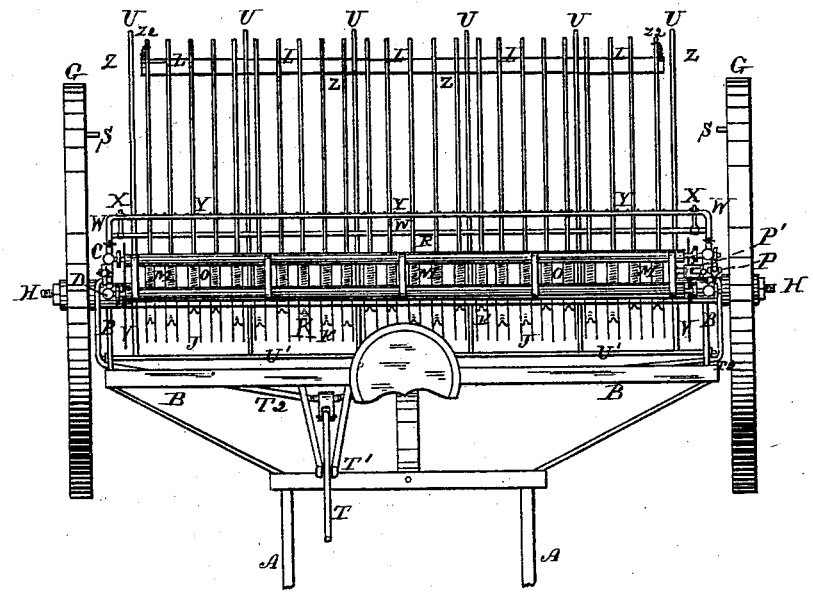
Figure 2:
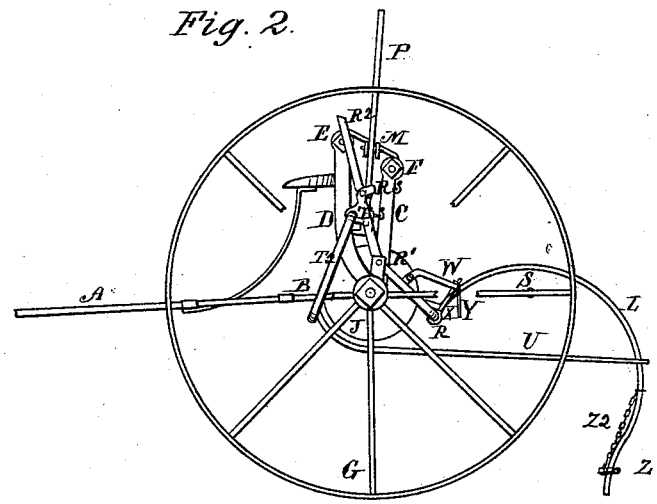
Figure 3:
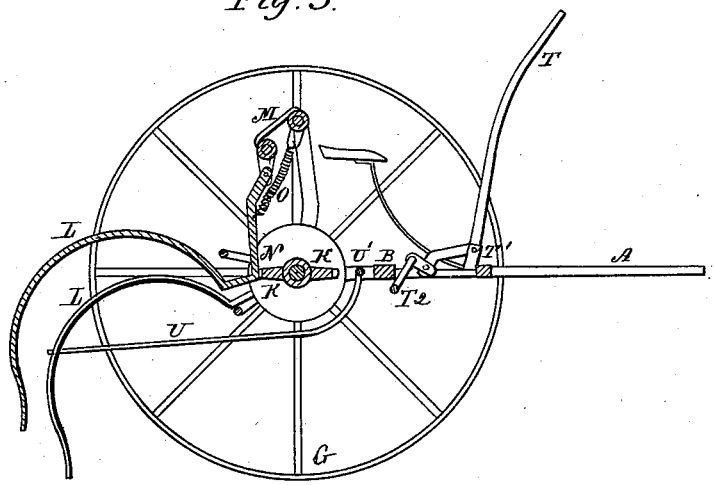
Figure 4:
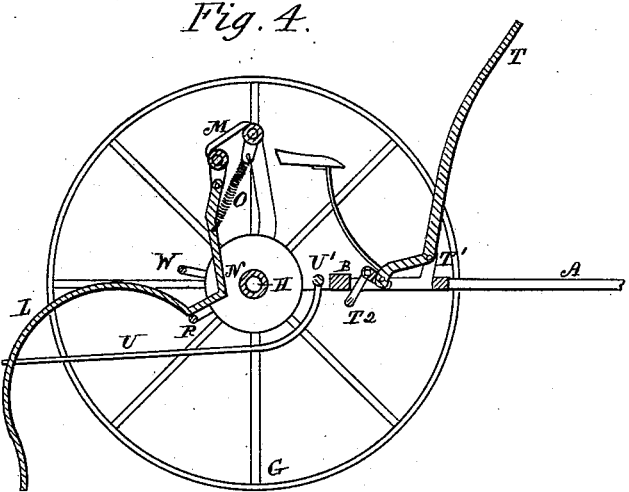

In the accompanying drawings, on three sheets, illustrating my invention, Figure 1 is a top view of my improved machine having part of the thills removed as not essential. Fig. 2 is a side view of the same. Fig. 3 is a section through the machine, showing the parts as arranged for a tedder. Fig. 4 is a section through the machine, showing the parts as arranged for a rake. Fig. 5 is a front view of one end of the machine, enlarged so as to show the parts better.

A A are the thills, which are attached to the frame B of the machine.

C and D are standards at each end of the frame, which support horizontal rods E F, upon which the frame carrying the rake mechanism slides, as will be described.

G G are the wheels, which are attached to an axle, H, running through the machine, and which turn with it. The axle turns in bearings in the frame B.

J J, &c., are a series of disks upon the axle H, between which the teeth of the rake are laterally confined when in operation. Between these disks, in each alternate opening, are the double cams K, for operating the tedder. These double cams are arranged in pairs, as shown in Figs. 1 and 5, so that two adjacent teeth are operated simultaneously.

L L are the teeth of the rake. They are of the form shown in the drawings, and are jointed or hinged to the sliding frame M, which moves laterally on the rods E and F, so that the whole set of teeth can be moved with the said frame the distance of the space between the disks J. Each of these teeth has a shoulder, N, which lies between the disks J, and which is operated by the cams K when the teeth lie between the proper disks.

O O, &c., are springs attached to the teeth and to the sliding frame M, for the purpose of holding the teeth down, and to hold them against the cams K when the machine is used as a tedder.

P is a lever for shifting the position of the sliding frame M. It is attached to the stationary frame of the machine at its lower end, and operates the sliding frame M by means of the link P'.

R is a bar running the whole width of the machine, under the teeth of the rake, for the purpose of raising them to discharge the hay when the apparatus is used as a rake. This bar turns upward at the ends, and is pivoted to the fixed frame at R'. The upper extremities of the sides form levers which are operated by pins S upon the wheels, which strike against and deflect the levers $R^2$ at each revolution of the wheels. The tops of these levers are made with a joint, $R^3$, so that when it is not desired to discharge the hay at regular distances they can be turned down to the rear on said joint, out of the way, and not be operated upon by the pins S.

T is a lever for operating the raising of the teeth of the rake whenever desired. It is pivoted to the fixed frame of the machine at T', and operates the rod $T^2$, extending across the machine and connecting with the bar R at $T^3$. By drawing this lever back the teeth are raised in the same manner as has been described by the pins S.

The foregoing are the chief operating parts of my improved machine, by which it is convertible into either a rake or tedder. When it is to be used as a rake the teeth lie between the disks J in the spaces without cams, and the hay is discharged at regular intervals by means of the pins upon the wheels, or, turning down the levers $R^2$, at any interval desired, by means of the lever T. When it is wished to use the machine as a tedder the lever T is drawn hard back to lift the teeth entirely out from between the disks J, and then the lever P is moved so as to throw the teeth laterally one division between the disks J, which brings the teeth over the cams K. The teeth are allowed to drop into these spaces, and the machine becomes a tedder. As the axle revolves the cams throw the teeth in pairs upward and backward, giving the kicking motion required for throwing and scattering the hay.

The machine can readily be reconverted into a rake by reversing the above described operation.

There are several accessory parts of my machine, which will now be described.

U U, &c., are long and nearly horizontal teeth, which extend from a bar, U', back between the teeth of the rake. They are for the purpose of holding the hay down and preventing its rising up against the working parts of the machine. The bar U' is attached to the fixed part of the frame of the machine, either directly or by means of disks V at each end, which are joined to the hub in which the axle turns.

W is a bar situated above the teeth of the rake from end to end, and attached to the bar R, with which it moves. It is shown in the drawings as bent back and jointed to R and firmly held by the bolts X. The purpose of this bar W is to press down the rake-teeth by pushing forward the lever T when desired. This bar W also has attached to it a series of vertical divisions, Y, which serve as guides, between which the teeth move up and down, and by which they are held more perfectly in their positions. In shifting from a rake to a tedder, and the reverse, it is necessary to remove this bar.

Z is a removable horizontal piece perforated for each tooth, and supported by short chains to the end teeth, as shown at $Z^2$. This is to serve for a sort of scraper when raking rowen, which would otherwise pass between the teeth.

My improved machine is intended to be drawn by a horse and driven from a seat in the usual manner, and the levers for operating the machine are so placed as to be accessible from the seat.

What I claim as my invention is—

1. In a hay rake and tedder, the combination of a series of teeth upon a shifting frame with a series of alternating cams and channels upon the revolving axle of the wheels, whereby the said teeth can be laterally shifted to remain at rest in the channels or be operated by the cams, substantially as described.

2. The combination of the teeth L, the sliding frame M, and the lever P with the fixed frame of the machine, substantially as described.

3. The combination of the bar R, having the jointed-lever ends $R^2$, with the pins S and the teeth L, substantially as described.

4. The horizontal perforated piece Z, in combination with the chains $Z^2$ and the teeth L, substantially as described.

EDWIN A. HILLS.

Witnesses:
 THEO. G. ELLIS,
 HERBERT W. STEARNS.